United States Patent
Xu et al.

(10) Patent No.: US 11,063,420 B2
(45) Date of Patent: Jul. 13, 2021

(54) OVERLOAD PROTECTION DEVICE AND METHOD, STORAGE MEDIUM, COMPRESSOR AND ELECTRIC APPLIANCE

(71) Applicants: Gree Electric Appliances (Wuhan) Co., Ltd, Wuhan (CN); Gree Electric Appliances, Inc. of Zhuhai, Zhuhai (CN)

(72) Inventors: Qihua Xu, Zhuhai (CN); Zhongliang Zhou, Zhuhai (CN); Jun Chen, Zhuhai (CN)

(73) Assignees: Gree Electric Appliance (Wuhan) Co., Ltd., Wuhan (CN); Gree Electric Appliances, Inc. of Zhuhai, Zhuhai (CN)

(*) Notice: Subject to any disclaimer, the term of this patent is extended or adjusted under 35 U.S.C. 154(b) by 14 days.

(21) Appl. No.: 16/618,519

(22) PCT Filed: Aug. 21, 2018

(86) PCT No.: PCT/CN2018/101536
§ 371 (c)(1),
(2) Date: Dec. 2, 2019

(87) PCT Pub. No.: WO2019/052317
PCT Pub. Date: Mar. 21, 2019

(65) Prior Publication Data
US 2020/0136368 A1 Apr. 30, 2020

(30) Foreign Application Priority Data

Sep. 15, 2017 (CN) .......................... 201710832181.8

(51) Int. Cl.
*H02H 5/04* (2006.01)
*F04B 49/02* (2006.01)
(Continued)

(52) U.S. Cl.
CPC ............. *H02H 5/04* (2013.01); *F04B 49/022* (2013.01); *H01H 35/24* (2013.01); *H01H 37/04* (2013.01); *H01H 37/52* (2013.01); *H02H 5/08* (2013.01)

(58) Field of Classification Search
CPC .......... H02H 5/04; H02H 5/08; H02H 7/0852; F04B 49/022; F04B 2207/03;
(Continued)

(56) References Cited

U.S. PATENT DOCUMENTS 4,092,573 A * 5/1978 D'Entremont ....... H01H 61/002
318/783
4,581,509 A * 4/1986 Sanford ................ H01H 35/34
200/302.1

(Continued)

FOREIGN PATENT DOCUMENTS

CN 201215088 Y 4/2009
CN 202816791 U 3/2013
(Continued)

OTHER PUBLICATIONS

Kuang; Chengxiao, "Built-in over-current overheating protector", Dec. 17, 2014, Entire Document (Translation of CN 104217896) (of record, cited in the IDS, including Original Copy). (Year: 2014).*

*Primary Examiner* — Stephen S Sul
(74) *Attorney, Agent, or Firm* — The Webb Law Firm

(57) ABSTRACT

Disclosed are an overload protection apparatus and method, and a storage medium, a compressor and an electric appliance. The apparatus includes: a first overload protection mechanism and a second overload protection mechanism, wherein the first overload protection mechanism is arranged to perform overload protection on the pressure of a compressor to be protected, and/or the second overload protection mechanism is arranged to perform overload protection (Continued)

on at least one of the temperature and the current of the compressor to be protected.

20 Claims, 2 Drawing Sheets

(51) Int. Cl.
*H01H 35/24* (2006.01)
*H01H 37/04* (2006.01)
*H01H 37/52* (2006.01)
*H02H 5/08* (2006.01)

(58) Field of Classification Search
CPC ...... F04B 2203/0401; F04B 2203/0201; F04B 2201/0403; F04B 49/10; F04B 49/02; F04B 49/065; H01H 35/24; H01H 37/04; H01H 37/52; H01H 35/34
USPC ....... 337/36, 75, 77, 85, 100, 101, 102, 107, 337/111, 200
See application file for complete search history.

(56) References Cited

U.S. PATENT DOCUMENTS

| | | | | |
|---|---|---|---|---|
| 5,898,555 | A * | 4/1999 | Katsumata | H01H 71/16 361/105 |
| 6,433,975 | B1 * | 8/2002 | Satoh | H01H 37/002 361/23 |
| 6,580,351 | B2 * | 6/2003 | Davis | H01H 37/54 337/111 |
| 8,154,237 | B2 * | 4/2012 | Higashikata | H01H 37/5418 318/481 |
| 8,717,140 | B2 * | 5/2014 | Hori | H01H 37/68 337/329 |
| 2004/0016241 | A1 * | 1/2004 | Street | F25B 49/02 62/129 |
| 2009/0315666 | A1 * | 12/2009 | Ueda | H01H 1/02372 337/298 |
| 2010/0207563 | A1 * | 8/2010 | Higashikata | F04B 35/04 318/473 |
| 2012/0268850 | A1 * | 10/2012 | Rainer | H01C 7/126 361/56 |
| 2015/0364282 | A1 * | 12/2015 | Higashikata | H01H 37/54 337/380 |
| 2018/0223697 | A1 * | 8/2018 | Laskowski | F01K 23/101 |

FOREIGN PATENT DOCUMENTS

| | | |
|---|---|---|
| CN | 203218179 U | 9/2013 |
| CN | 104217896 A | 12/2014 |
| CN | 205789707 U | 12/2016 |
| CN | 107611926 A | 1/2018 |
| CN | 207442431 U | 6/2018 |
| EP | 2175135 A1 | 4/2010 |
| JP | H08261160 A | 10/1996 |
| JP | 3188890 B2 | 7/2001 |
| WO | 0199134 A2 | 12/2001 |
| WO | 2004033909 A1 | 4/2004 |

* cited by examiner ical solutions, is needed to prevent damage to a motor of the compressor due to overlarge current or excessive exhaust gas temperature, thus ensuring

OVERLOAD PROTECTION DEVICE AND METHOD, STORAGE MEDIUM, COMPRESSOR AND ELECTRIC APPLIANCE

CROSS-REFERENCE TO RELATED APPLICATIONS

This application is the United States national phase of International Application No. PCT/CN2018/101536 filed Aug. 21, 2018, and claims priority to Chinese Patent Application No. 201710832181.8 filed Sep. 15, 2017, the disclosures of which are hereby incorporated by reference in their entirety.

BACKGROUND OF THE INVENTION

Field of the Invention

The present disclosure relates to overload protection and, in some non-limiting embodiments, to an overload protection device and method, a storage medium, a compressor, an electric appliance, and a processor.

Description of the Related Art

An air conditioning system is a system that can control the temperature, humidity, cleanliness and airflow speed of indoor air. At present, for a compressor of a household air conditioning system, generally a current overload protector and a temperature overload protector is needed to prevent damage to a motor of the compressor due to overlarge current or excessive exhaust gas temperature, thus ensuring the compressor can operate normally. Moreover, a pressure switch is needed to be welded at a high pressure side of the air conditioning system. When the pressure of the high pressure side exceeds the maximum allowable pressure of the air conditioning system, the pressure switch is turned off to make the compressor stop running to protect the pipeline at the high pressure side.

SUMMARY

Other features and advantages of the present disclosure will be set forth in the following description, and partially become obvious from the description, or are understood by implementing the present disclosure.

The technical solutions of the present disclosure are further described in detail below with reference to drawings and embodiments.

In combination with the drawings, reference signs in the embodiments of the present disclosure are as follows:

10—first overload protection mechanism; 11—pressure sensing port; 12—pressure diaphragm; 13—transmission rod; 14—microswitch; 20—second overload protection mechanism (i.e., current and/or temperature overload protection mechanism); 21—heater; 22—temperature contact piece; 23—temperature contact; 231—stationary contact; 232—movable contact; 24—first terminal; 25—second terminal; 30—housing; 32—shell cover (for example, metal shell cover); 31—base (for example, heat resistant resin base).

DETAILED DESCRIPTION

In order that the purposes, technical solutions and advantages of the present disclosure are clearer, a clear and complete description of technical solutions of the present disclosure will be given below in combination with specific embodiments of the present disclosure and corresponding drawings. Apparently, the embodiments described below are merely a part, but not all, of the embodiments of the present disclosure. All other embodiments, obtained by those skilled in the art based on the embodiments of the present disclosure without any creative effort, fall into the protection scope of the present disclosure.

In some non-limiting embodiments, at least two types of overload protectors may be needed to be used in an air conditioning system to protect the air conditioning system. Control processes of the overload protectors may be cumbersome, the design of the air conditioning system complicated, and the cost of the air conditioning system high.

Figure 1:
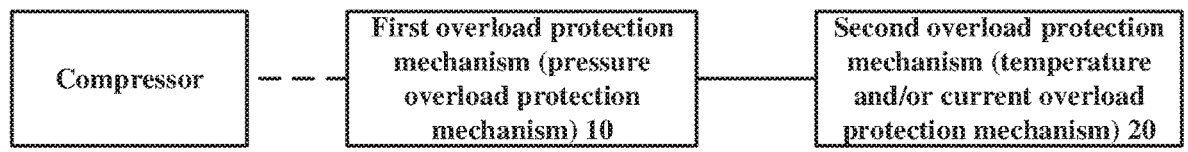
FIG. 1 is a schematic structural diagram of an overload protection device according to embodiments of the present disclosure.

According to some non-limiting embodiments of the present disclosure, an overload protection device is provided. FIG. 1 is a schematic structural diagram of an overload protection device according to some non-limiting embodiments of the present disclosure. In some non-limiting embodiments, the overload protection device comprises a first overload protection mechanism 10 and a second overload protection mechanism 20.

In some non-limiting embodiments, the first overload protection mechanism 10 is configured to provide overload protection for a pressure of a compressor to be protected.

In some non-limiting embodiments, the first overload protection mechanism 10 comprises a pressure diaphragm 12, a transmission rod 13 and a control switch.

In some non-limiting embodiments, a first end of the transmission rod 13 is adaptively in contact with the pressure diaphragm 12, and a second end of the transmission rod 13 is adaptively in contact with a control end of the control switch.

In some non-limiting embodiments, at least one fixed end of the control switch is adaptively connected to a power supply end of the compressor to be protected through the second overload protection mechanism 20.

Therefore, the pressure diaphragm, the transmission rod and the control switch are adaptively arranged, and pressure overload protection may be realized. Furthermore, the structure of the first overload protection mechanism 10 is simple, and the reliability of control of the first overload protection mechanism 10 is high.

In some non-limiting embodiments, the pressure diaphragm 12 comprises a metal diaphragm.

Thus, the touch sensitivity is high, and the reliability is high by using the metal diaphragm as the pressure diaphragm.

In some non-limiting embodiments, the control switch comprises a microswitch 14.

In some non-limiting embodiments, a first fixed end 141 of the microswitch 14 is connected to a shell cover 32 of a housing 30. A second fixed end 142 of the microswitch 14 is adaptively connected to the power supply end PD of the compressor to be protected through a heater 21 and a first terminal 24.

Thus, the reaction sensitivity is high, and the accuracy is high by using the microswitch as the control switch.

In some non-limiting embodiments, the first overload protection mechanism 10 further comprises a pressure sensing port 11.

In some non-limiting embodiments, the pressure sensing port 11 is adaptively disposed with the pressure diaphragm 12 and is configured to allow the refrigerant vapor of an exhaust end ED of the compressor to be protected to pass and arrive at the pressure diaphragm 12. The pressure diaphragm 12 is deformed to force the transmission rod 13 to move, and the movement of the transmission rod 13 turns on or turns off the control switch.

In some non-limiting embodiments, the high pressure refrigerant vapor acts on the metal pressure diaphragm through the pressure sensing port to deform the diaphragm. The deformed diaphragm forces the transmission rod to move, thus turning on or turning off the microswitch.

Thus, through the adaptive arrangement of the pressure sensing port: on one hand, the other elements in the first overload protection mechanism are protected; and on the other hand, the pressure diaphragm conveniently senses the exhaust pressure of the compressor. The structure is reasonable, and the control reliability is high.

In some non-limiting embodiments, in a case where the device further comprises the housing 30, the pressure sensing port 11 is adaptively disposed at a position of the housing 30 opposite to the pressure diaphragm 12.

Thus, the structure is reasonable as the pressure sensing port is disposed at the position of the housing opposite to the pressure diaphragm.

In some non-limiting embodiments, the pressure sensing port 11 communicates with the external environment of the first overload protection mechanism 10, and other parts of the first overload protection mechanism 10 other than the pressure sensing port 11 are all sealed.

For example, the pressure sensing port of the pressure overload protector may communicate with the outside, and other positions of the pressure overload protector other than the pressure sensing port are all sealed.

Thus, the pressure sensing port communicates the pressure sensing port with the outside and the other elements in the first overload protection mechanism are sealed. The first overload protection mechanism is compact in structure and convenient in pressure sensing, which is beneficial for improving the sensing reliability.

In some non-limiting embodiments, the second overload protection mechanism 20 is configured to provide overload protection on at least one of the temperature or the current of the compressor to be protected.

For example, the overload protection device is an integrated pressure, temperature and current overload protector for air conditioner. The overload protector integrates the overload protection of pressure, temperature, current, and the like. Thus, the problems that the air conditioning system has excessive overload protectors and that the overload protection control is complicated are solved.

Thus, the first overload protection mechanism provides the pressure protection, and the second overload protection mechanism provides the protection of at least one of the temperature or the current of. The overload protection of pressure, temperature, current, and the like is integrated. The problems that the air conditioning system has excessive overload protectors and that the overload protection control is complicated are solved. The control process is simplified, and the structure is also simplified.

In some non-limiting embodiments, the second overload protection mechanism 20 comprises at least one of a heater 21 or a temperature contact piece 22.

In some non-limiting embodiments, at least one connection end of the heater 21 is adaptively connected to the power supply end of the compressor to be protected.

In some non-limiting embodiments, the heater 21 comprises a resistance wire.

For example, the heater itself is a resistance wire, which generates heat due to the thermal effect of the current. It can be seen from $P=I^2*R$ that in a case where the voltage is constant and the current I increases, the heating power P of the resistance wire increases. In a case where the current reaches the maximum allowable current, the heat generated by the resistance wire makes a bimetal piece or a trimetal piece deform and disconnect from a temperature contact.

Thus, the structure is simple, and the reliability of current sensing is high by using the resistance wire as the heater.

In some non-limiting embodiments, at least one contact end of the temperature contact piece 22 is adaptively connected to the power supply end of the compressor to be protected through a temperature contact 23 which is adaptively disposed with the temperature contact piece 22.

Thus, the overload protection of the current and the temperature is realized through the adaptive arrangement of the heater and the temperature contact piece. The structure is simple, and the reliability is high.

In some non-limiting embodiments, the temperature contact piece 22 comprises a bimetal piece or a trimetal piece. The temperature contact piece 22 is configured to deform when being heated, based on the environment temperature of the compressor to be protected, and/or the current of the motor of the compressor to be protected, thus connecting to or disconnecting from the temperature contact 23.

For example, the external temperature of the overload protector is abnormally high. In a case where the external temperature exceeds the maximum allowable temperature, the temperature and the deformation of the bimetal piece (or the trimetal piece) increases, so that the bimetal piece disconnects from the temperature contact. In a case where the temperature is lower than a set lower temperature limit, the bimetal piece connects to the temperature contact.

In some non-limiting embodiments, the metal contact piece comprises a bimetal piece or a trimetal piece. The functions of the bimetal piece and the trimetal piece are the same, and the trimetal piece is more sensitive. As a result, the trimetal piece gradually replaces the bimetal piece.

For example, since the bimetal piece or the trimetal piece is formed by laminating two or three metals with different thermal expansion coefficients, one side of the bimetal piece or the trimetal piece is bent, due to the difference of extension caused by the different thermal expansion coefficients during heating, to connect to or disconnect from the temperature contact point.

Thus, the sensitivity to temperature is high, and the reliability is high by using the bimetal piece or the trimetal piece as the temperature contact piece.

In some non-limiting embodiments, the temperature contact 23 comprises a stationary contact 231 and a movable contact 232.

In a more optional specific example, the stationary contact 231 is adaptively connected to one end of a second terminal 25.

In some non-limiting embodiments, the movable contact 232 is adaptively connected to a second contact end of the temperature contact piece 22.

In a more optional specific example, a first contact end of the temperature contact piece 22 is adaptively disposed on a shell wall of the shell cover 32 of the housing 30.

Thus, through the adaptive arrangement of the stationary contact and the movable contact, the contact or disconnection of the temperature contact piece and the temperature contact is more convenient. The reliability and sensitivity of the temperature control are improved.

The shell cover 32 is in a shape of a cylinder or a quadrangular prism.

Thus, the overload protection device is applied to various occasions with the shell cover of various shapes. The application range is wide, the use flexibility is good, and the versatility is high.

In some non-limiting embodiments, the second overload protection mechanism 20 further comprises the first terminal 24 and the second terminal 25.

In some non-limiting embodiments, the first terminal 24 and the second terminal 25 are adaptively connected to the power supply end of the compressor to be protected, respectively.

In an optional specific example, a first connection end of the heater 21 is adaptively connected to the first overload protection mechanism 10. A second connection end of the heater 21 is adaptively connected to the first terminal 24.

In some non-limiting embodiments, the first contact end of the temperature contact piece 22 is fixedly disposed. The second contact end of the temperature contact piece 22 is adaptively connected to the second terminal 25 through the temperature contact 23.

Thus, through the adaptive arrangement of the terminals, the connection between the overload protection device and the compressor is more convenient, safe and reliable.

In some non-limiting embodiments, the first terminal 24 and the second terminal 25 are respectively inserted into a base 31 of the housing 30 and protrude from the housing 30.

Thus, through the adaptive arrangement of the terminals and the housing, the mounting stability and the mounting reliability of the terminals are improved.

In some non-limiting embodiments, the first overload protection mechanism 10 and the second overload protection mechanism 20 are integrally disposed.

In some non-limiting embodiments, the first overload protection mechanism 10 and the second overload protection mechanism 20 are disposed in series.

For example, the overload protection of pressure, temperature, current, and the like are integrated. The problems that the air conditioning system has excessive overload protectors, the overload protection control of the air conditioning system is complicated, and the components of the air conditioning system components are complicated and numerous are solved. The number of overload protection components of the air conditioning system is decreased, and the overload protection control of the air conditioning system is simplified.

Therefore, through the integrated arrangement, the serial arrangement and the like of the first overload protection mechanism and the second overload protection mechanism, various control modes such as integrated control and linkage control of overload protection of pressure, temperature, current and the like are realized. The control process is simpler, and the control structure is simpler.

In some non-limiting embodiments, the overload protection device also comprises the housing 30.

In some non-limiting embodiments, the first overload protection mechanism 10 and the second overload protection mechanism 20 are adaptively installed in the housing 30, respectively.

In some non-limiting embodiments, the housing 30 is filled with an inert gas.

For example, the housing 30 is filled with an inert gas such as helium gas or neon gas and the like to provide arc extinguishing and heat conduction protection for at least one of the first overload protection mechanism 10 or the second overload protection mechanism 20.

For example, the pressure, temperature and current overload protector is filled with an inert gas to achieve arc extinguishing and heat conduction.

Thus, through the adaptive arrangement of the housing, the first overload protection mechanism and the second overload protection mechanism are accommodated and protected. The adaptive arrangement of the housing is also beneficial for improving the reliability and safety of the overload protection and the operation of the compressor.

In some non-limiting embodiments, the base 31 comprises a base 31 and a shell cover 32.

In some non-limiting embodiments, the base 31 comprises a heat resistant resin base.

In some non-limiting embodiments, the shell cover 32 comprises a metal shell.

For example, in the internal structure of such a pressure, temperature and current overload protector, a pressure controller, the heater and the metal contact piece are disposed in the metal shell in a shape of cylinder or quadrangular prism and the heat resistant resin (for example, high temperature resistant resin) base. In some non-limiting embodiments, the pressure controller is a pressure overload protector.

Thus, by using heat resistant resin material as the base and using metal material as the shell cover, it is beneficial for improving the safety and the reliability of the protection of the first overload protection mechanism and the second overload protection mechanism.

A large number of tests and verification prove that, the technical solutions of the present embodiments, in which the overload protections of pressure, temperature, current and the like are integrated, solve the problems that the air conditioning system has excessive overload protectors and that the overload protection control is complicated, and make the control process simple.

According to some non-limiting embodiments of the present disclosure, an overload protection method corresponding to the overload protection device is also provided. The overload protection method comprises: providing overload protection for the pressure of the compressor to be protected by using the overload protection device described above; and/or, providing overload protection for at least one of temperature or current of the compressor to be protected by using the overload protection device described above.

For example, in the air conditioning system, the overload protector replaces the temperature and current overload protectors in the compressor and the pressure controller disposed on the pipeline between exhausting gases and a condenser. In a refrigeration or heating mode, if the current of a motor passing through the compressor continues to be too high, the heater in the overload protector will generate heat. The bimetal piece is heated to deform to disconnect from the temperature contact to make the overload protector turn off.

For example, the overload protection device is an integrated pressure, temperature and current overload protector for air conditioner. The overload protector integrates the overload protection of pressure, temperature, current and the like, thereby solving the problems that the air conditioning system has excessive overload protectors and that the overload protection control is complicated.

Thus, by means of the pressure protection of the first overload protection mechanism, and the protection of at least one of the temperature or the current of the second overload protection mechanism, the overload protection of pressure, temperature, current and the like is integrated. The problems that the air conditioning system has excessive overload protectors and that the overload protection control is complicated are solved. The control process is simplified, and the structure is also simplified.

In some non-limiting embodiments, providing overload protection for the pressure of the compressor to be protected comprises: in a case where the pressure of refrigerant vapor at the exhaust end of the compressor to be protected exceeds a set pressure range, the pressure diaphragm 12 in the first overload protection mechanism 10 deforms to force the transmission rod 13 to move to turn off the control switch, thus achieving the pressure overload protection of the refrigerant vapor of the compressor to be protected.

Thus, by means of the adaptive arrangement of the pressure diaphragm, the transmission rod and the control switch, pressure overload protection is realized. Furthermore, the structure is simple, and the control reliability is high.

In some examples, the providing overload protection for at least one of temperature or current of the compressor to be protected comprises: in a case where an environment temperature of the compressor to be protected exceeds a set temperature range, a temperature contact piece 22 in the second overload protection mechanism 20 deforms to disconnect from the temperature contact 23, thus achieving the temperature overload protection of the compressor to be protected.

In some non-limiting embodiments, the performing overload protection on at least one of temperature and current of the compressor to be protected further comprises: in a case where the current of a motor of the compressor to be protected exceeds a set current range, a heater 21 in the second overload protection mechanism 20 generates heat to deform the temperature contact piece 22 to make the temperature contact piece 22 disconnect from the temperature contact 23, thus achieving the current overload protection of the compressor to be protected.

For example, in a refrigeration mode, in a case where the external environment is too high and exceeds the allowable use range, or a condenser is dirty, or the rotating speed of a draught fan at high pressure side is too low, the exhaust gas temperature will increase, or the exhaust gas pressure will rise. In a case where the exhaust gas temperature rises to the maximum allowable upper temperature limit (for example, the allowable use range of the exhaust gas temperature may be 105° C.-135° C.), or the exhaust gas pressure exceeds the maximum allowable upper pressure limit (for example, the allowable use range of the exhaust gas pressure may be 3.8 MPa-4.8 MPa) of the system, the control switch is turned off, or the bimetal piece is heated to deform to disconnect from the temperature contact. Thus, the overload protector will turn off to make the compressor stop running to protect the motor of the compressor, the housing of the compressor and the system pipeline from being damaged by high temperature or high pressure.

For example, in a heating mode, in a case where the exhaust gas temperature exceeds the maximum allowable temperature upper limit (105° C.-135° C.), or the exhaust gas pressure exceeds the maximum allowable pressure upper limit (3.8 MPa-4.8 MPa) of the system, the overload protector will turn off to make the compressor stop running to protect the motor of the compressor, the housing of the compressor and the system pipeline from being damaged by high temperature or high pressure.

Thus, through the adaptive arrangement of the heater and the temperature contact piece, the overload protection of current and temperature is realized. The structure is simple, and the reliability is high.

In some non-limiting embodiments, the overload protection method further comprises: only in a case where the pressure of refrigerant vapor does not exceed the set pressure range, the environment temperature does not exceed the set temperature range, and the current of the motor does not exceed the set current range, the compressor to be protected is powered and running.

For example, such an integrated pressure, temperature and current overload protector is a serial overload protector. As long as one of the pressure, the current and the temperature exceeds corresponding allowable use range, the overload protector will turn off. Only in a case where the pressure, the current and the temperature are each recovered to be within corresponding allowable use range, the overload protector will be turned on again.

For example, the overload protector is disposed in the compressor of an air conditioner. After the compressor of the air conditioner is turned on, in a case where the temperature of the external environment is within the allowable range, and the exhaust gas pressure and the current of the motor of the compressor are normal, the overload protector does not disconnect, and the compressor runs normally.

Therefore, through the integrated arrangement, the serial arrangement and the like of the first overload protection mechanism and the second overload protection mechanism, various control modes such as integrated control and linkage control of overload protection of pressure, temperature, current and the like are realized. The control process is simpler, and the control structure is simpler.

Figure 2:
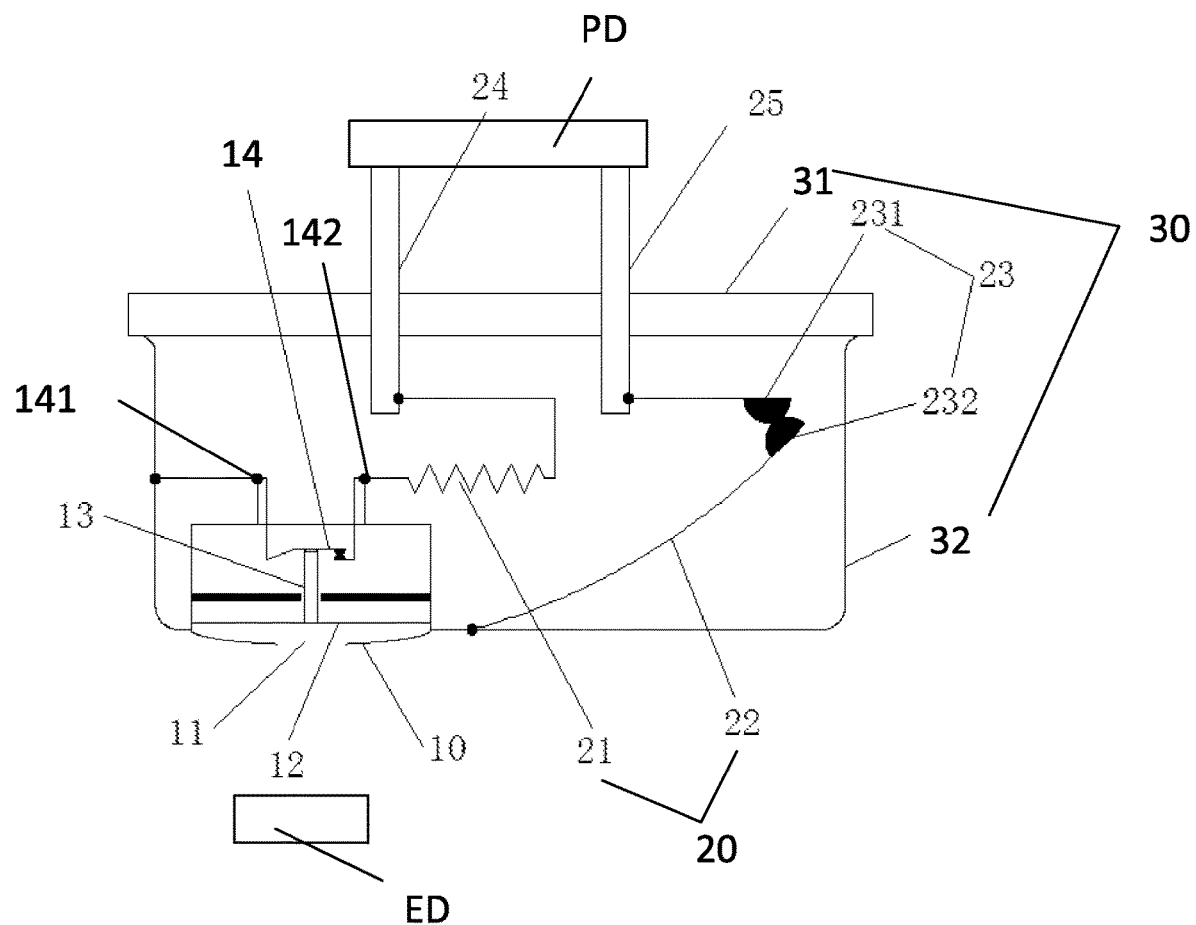
FIG. 2 is a schematic structural diagram of an overload protection device according to embodiments of the present disclosure.

The processing and functions implemented by the method of the embodiments substantially correspond to those of the foregoing embodiments, principles and examples of the device shown in FIG. 1 to FIG. 2. Therefore, for parts that are not described in detail in the description of the method of the embodiments, reference may be made to relevant description in the foregoing embodiments, and no repeated description is given herein.

A large number of tests and verification prove that, the technical solutions of the present embodiments, in which the overload protections of pressure, temperature, current and the like are integrated, reduce the number of overload protection components of the air conditioning system and solve the problem that the air conditioning system has excessive overload protectors.

According to embodiments of the present disclosure, a storage medium corresponding to the overload protection method is also provided. A plurality of instructions is stored in the storage medium, and the plurality of instructions are configured to be loaded by a processor to execute the overload protection method described above.

The processing and functions implemented by the storage medium of the embodiments substantially correspond to those of the foregoing embodiments, principles and examples of the method. Therefore, for parts that are not described in detail in the description of the storage medium of the embodiments, reference may be made to relevant description in the foregoing embodiments, and no repeated description is given herein.

A large number of tests and verification prove that, the technical solutions of the present embodiments, in which the overload protections of pressure, temperature, current and the like are integrated, simplify the overload protection control of the air conditioning system and solve the problem that the overload protection control of the air conditioning system is cumbersome.

According to embodiments of the present disclosure, a compressor corresponding to the overload protection device or the overload protection method is also provided. The compressor comprises the overload protection device described above. In some non-limiting embodiments, the compressor comprises a memory configured to store a plurality of instructions; and a processor configured to load the plurality of instructions stored in the memory to execute the overload protection method described above.

In some non-limiting embodiments, the compressor comprises a rotor type invariable frequency compressor or a vortex type invariable frequency compressor.

For example, the overload protector is disposed in a top shell or a high pressure chamber of the rotor type invariable frequency compressor or the vortex type invariable frequency compressor.

In some non-limiting embodiments, the overload protection device is adaptively installed in the top shell or the high pressure chamber of the compressor and is connected in series with a main circuit of the motor of the compressor.

For example, such an overload protector is adapted to be installed in the rotor type invariable frequency compressor or other compressors (for example, a vortex type compressor and the like) with different operation modes. For example, such an overload protector is installed at the top or in the high pressure chamber of the compressor, that is, installed at a high pressure side, and connected in series with the main circuit of the motor of the compressor.

The processing and functions implemented by the compressor of the embodiments substantially correspond to those of the foregoing embodiments, principles and examples of the method. Therefore, for parts that are not described in detail in the description of the compressor of the embodiments, reference may be made to relevant description in the foregoing embodiments, and no repeated description is given herein.

A large number of tests and verification prove that, the technical solutions of the present embodiments, in which the overload protections of pressure, temperature, current and the like are integrated, solve the problem that the air conditioning system has complicated and numerous parts and components. The structure is simplified, and the cost is reduced.

According to embodiments of the present disclosure, an electric appliance corresponding to the compressor is also provided. The appliance comprises the compressor described above.

In some non-limiting embodiments, the electrical appliance comprises at least one of an air conditioner, a refrigerator, or a water heater.

In some non-limiting embodiments, the overload protection device used by the air conditioner is an integrated pressure, temperature and current overload protector for air conditioner. The overload protector integrates the overload protection of pressure, temperature, current and the like, thereby solving the problems that the air conditioning system has excessive overload protectors and that the overload protection control is complicated.

In such a pressure, temperature and current overload protector, the pressure controller, the heater and the metal contact piece are installed in the metal shell in a shape of the cylinder or quadrangular prism and the heat resistant resin (for example, high temperature resistant resin) base. In some non-limiting embodiments, the pressure controller is a pressure overload protector.

In some non-limiting embodiments, the pressure sensing port of the pressure overload protector communicates with the outside, and other positions of the pressure overload protector other than the pressure sensing port are all sealed.

In some non-limiting embodiments, the pressure, temperature and current overload protector is filled with an inert gas to achieve arc extinguishing and heat conduction.

In some non-limiting embodiments, the metal contact piece comprises a bimetal piece (or a trimetal piece). The functions of the bimetal piece and the trimetal piece are the same, and the trimetal piece is more sensitive. As a result, the trimetal piece gradually replaces the bimetal piece.

Since the bimetal piece or the trimetal piece is formed by laminating two or three metals with different thermal expansion coefficients, one side of the bimetal piece or the trimetal piece is bent, due to the difference of extension caused by the different thermal expansion coefficients during heating, to connect to or disconnect from the temperature contact point. In a case where the external temperature of the overload protector is abnormally high, and exceeds the maximum allowable temperature, the temperature and the deformation of the bimetal piece (or the trimetal piece) increases, so that the bimetal piece disconnects from the temperature contact. In a case where the temperature is lower than a set lower temperature limit, the bimetal piece connects to the temperature contact.

In some non-limiting embodiments, the heater itself is a resistance wire, which generates heat due to the thermal effect of the current. It can be seen from $P=I^2*R$ that in a case where the voltage is constant and the current I increases, the heating power P of the resistance wire increases. In a case where the current reaches the maximum allowable current, the heat generated by the resistance wire makes a bimetal piece or a trimetal piece deform and disconnect from a temperature contact.

In some non-limiting embodiments, the high pressure refrigerant vapor acts on the metal pressure diaphragm through the pressure sensing port to deform the diaphragm. The deformed diaphragm forces the transmission rod to move, thus turning on or turning off the micro switch.

In some non-limiting embodiments, such an integrated pressure, temperature and current overload protector is a serial overload protector. As long as one of the pressure, the current and the temperature exceeds corresponding allowable use range, the overload protector will turn off. Only in a case where the pressure, the current and the temperature are each recovered to be within corresponding allowable use range, the overload protector will be turned on again.

In some non-limiting embodiments, such an overload protector is adapted to be installed in the rotor type invariable frequency compressor or other compressors (for example, a vortex type compressor and the like) with different operation modes. For example, such an overload protector is installed at the top or in the high pressure chamber of the compressor, that is, installed at a high pressure side, and connected in series with the main circuit of the motor of the compressor.

In some non-limiting embodiments, the overload protector is applied to be in the interior of the top shell or the high pressure chamber of the rotor type invariable frequency compressor and the vortex type invariable frequency compressor.

In some non-limiting embodiments, the overload protector is disposed in the compressor of an air conditioner. After the compressor of the air conditioner is turned on, in a case where the temperature of the external environment is within the allowable range, and the exhaust gas pressure and the current of the motor of the compressor are normal, the overload protector does not disconnect, and the compressor runs normally.

In some non-limiting embodiments, in a refrigeration mode, in a case where the external environment is too high and exceeds the allowable use range, or a condenser is dirty, or the rotating speed of a draught fan at high pressure side is too low, the exhaust gas temperature will increase, or the exhaust gas pressure will rise. In a case where the exhaust gas temperature rises to the maximum allowable upper temperature limit (for example, the allowable use range of the exhaust gas temperature may be 105° C.-135° C.), or the exhaust gas pressure exceeds the maximum allowable upper pressure limit (for example, the allowable use range of the exhaust gas pressure may be 3.8 MPa-4.8 MPa) of the system, the control switch is turned off, or the bimetal piece is heated to deform to disconnect from the temperature contact. Thus, the overload protector will turn off to make the compressor stop running to protect the motor of the compressor, the housing of the compressor and the system pipeline from being damaged by high temperature or high pressure.

In some non-limiting embodiments, in a heating mode, in a case where the exhaust gas temperature exceeds the maximum allowable temperature upper limit (105° C.-135° C.), or the exhaust gas pressure exceeds the maximum allowable pressure upper limit (3.8 MPa-4.8 MPa) of the system, the overload protector will turn off to make the compressor stop running to protect the motor of the compressor, the housing of the compressor and the system pipeline from being damaged by high temperature or high pressure.

In an optional example, in a refrigeration or heating mode, if the current of a motor passing through the compressor continues to be too high, the heater in the overload protector will generate heat. The bimetal piece is heated to deform to disconnect from the temperature contact to make the overload protector turn off.

It can be seen that in the air conditioning system, such an overload protector replaces the temperature and current overload protectors in the compressor and the pressure controller disposed on the pipeline between exhausting gases and a condenser.

The processing and functions implemented by the electric appliance of the embodiments substantially correspond to those of the foregoing embodiments, principles and examples of the compressor. Therefore, for parts that are not described in detail in the description of the electric appliance of the embodiments, reference may be made to relevant description in the foregoing embodiments, and no repeated description is given herein.

A large number of tests and verification prove that, in the technical solutions of the present disclosure, the overload protector integrating the overload protection of pressure, temperature and current and the like replaces the temperature and current overload protectors and the pressure controller disposed on the pipeline between exhausting gases and a condenser in the air conditioning system. The protection structure and the protection process of the air conditioning system are simplified, and the user experience is improved.

In summary, those skilled in the art will readily understand that the above advantageous modes may be freely combined and superimposed without conflict.

The above descriptions are merely embodiments of the present disclosure and are not configured to limit the present disclosure. The present disclosure may have various changes and modifications for those skilled in the art. Any modifications, equivalent substitutions, improvements and the like, made within the spirit and scope of the present disclosure, should fall in the scope of the claims of the present disclosure.

INDUSTRIAL APPLICABILITY

In the technical solutions of the present disclosure, by means of the integrated arrangement of the overload protection structure of pressure, temperature and current, the problem that the air conditioning system needs to use at least two overload protectors to protect complete machine protection is solved. The defects of a cumbersome control process, complicated structure and high cost are accordingly overcome, and the beneficial effects of simple control process, simple structure and low cost are achieved.

The invention claimed is:

1. An overload protection device, comprising: a first overload protection mechanism and a second overload protection mechanism, wherein:
   the first overload protection mechanism is configured to provide overload protection for a pressure of a compressor to be protected, and comprises a pressure sensing port, a pressure diaphragm, a transmission rod and a control switch; and,
   the second overload protection mechanism is configured to provide overload protection for at least one of a temperature or a current of the compressor to be protected, and comprises a heater and a temperature contact piece, wherein:
   a first end of the transmission rod is adaptively in contact with the pressure diaphragm;
   a second end of the transmission rod is adaptively in contact with a control end of the control switch;
   at least one fixed end of the control switch is adaptively connected to a power supply end of the compressor to be protected through the heater;
   the pressure sensing port is configured to allow refrigerant vapor of an exhaust end of the compressor to be protected to pass through and arrive at the pressure diaphragm, wherein the refrigerant vapor deforms the pressure diaphragm to force the transmission rod to move towards the control switch so as to turn off the control switch, or move away the control switch so as to turn on the control switch; and
   at least one contact end of the temperature contact piece is adaptively connected to the power supply end of the compressor to be protected through a temperature contact adaptively disposed with the temperature contact piece.

2. The overload protection device according to claim 1, further comprising a housing, wherein
   the first overload protection mechanism and the second overload protection mechanism are adaptively installed in the housing, respectively.

3. The overload protection device according to claim 2, wherein the housing comprises a base and a shell cover, wherein the housing has one or more of the following features:
   the base comprises a heat resistant resin base;
   the shell cover comprises a metal shell.

4. The overload protection device according to claim 2, wherein the housing is filled with an inert gas.

5. The overload protection device according to claim 2, wherein the first overload protection mechanism and the second overload protection mechanism are integrally disposed or, are disposed in series.

6. The overload protection device according to claim 1, wherein
the overload protection device comprises a housing, the pressure sensing port is adaptively disposed at a position of the housing opposite to the pressure diaphragm;
the pressure sensing port communicates with an external environment of the first overload protection mechanism, and other parts of the first overload protection mechanism other than the pressure sensing port are all sealed.

7. The overload protection device according to claim 1, wherein the overload protection device has one or more of the following features:
the pressure diaphragm comprises a metal diaphragm;
the control switch comprises a microswitch.

8. The overload protection device according to claim 1, wherein the second overload protection mechanism further comprises: a first terminal and a second terminal, wherein:
the first terminal and the second terminal are adaptively connected to the power supply end of the compressor to be protected, respectively;
wherein the overload protection device has one or more of the following features:
a first connection end of the heater is adaptively connected to the at least one fixed end of the control switch of the first overload protection mechanism, and a second connection end of the heater is adaptively connected to the first terminal;
a first contact end of the temperature contact piece is fixedly disposed, and a second contact end of the temperature contact piece is adaptively connected to the second terminal through the temperature contact.

9. The overload protection device according to claim 8, wherein the overload protection device has one or more of the following features:
the heater comprises a resistance wire;
the temperature contact piece comprises a bimetal piece or a trimetal piece, the temperature contact piece is configured to deform when being heated, based on at least one of an environment temperature of the compressor to be protected or a current of a motor of the compressor to be protected, to connect to or disconnect from the temperature contact;
the temperature contact comprises a stationary contact and a movable contact, wherein the temperature contact has one or more of the following features: the stationary contact is adaptively disposed with one end of the second terminal, the movable contact is adaptively disposed with the second contact end of the temperature contact.

10. The overload protection device according to claim 8, wherein the overload protection device comprises a housing, the overload protection device has one or more of the following features:
the first terminal and the second terminal are respectively inserted into a base of the housing and protrude from the housing;
the first contact end of the temperature contact piece is adaptively disposed on a shell wall of a shell cover of the housing, wherein the shell cover is in a shape of a cylinder or a quadrangular prism.

11. An overload protection method by using the overload protection device according to claim 1, comprising one or more of the following steps:
providing the overload protection for the pressure of the compressor to be protected;
providing the overload protection for at least one of the temperature or the current of the compressor to be protected.

12. The overload protection method according to claim 11, wherein the overload protection method has one or more of the following features:
providing the overload protection for the pressure of the compressor to be protected comprises:
in a case where a pressure of the refrigerant vapor from an exhaust end of the compressor to be protected exceeds a set pressure range, the pressure diaphragm in the first overload protection mechanism deforms to force the transmission rod to move to turn off the control switch, so as to provide overload protection for the pressure of the refrigerant vapor of the compressor to be protected;
providing the overload protection for at least one of the temperature or the current of the compressor to be protected comprises one or more of the following steps:
in a case where an environment temperature of the compressor to be protected exceeds a set temperature range, a temperature contact piece in the second overload protection mechanism deforms to disconnect from a temperature contact, so as to provide the overload protection for the temperature of the compressor to be protected;
in a case where the current of a motor of the compressor to be protected exceeds a set current range, a heater in the second overload protection mechanism generates heat to deform the temperature contact piece and disconnect from the temperature contact, so as to provide the overload protection for the current of the compressor to be protected.

13. The overload protection method according to claim 12, further comprising:
in a case where the pressure of the refrigerant vapor does not exceed the set pressure range, an environment temperature does not exceed the set temperature range, and the current of the motor does not exceed the set current range, the compressor to be protected is powered and running.

14. A storage medium comprising at least one non-transitory computer-readable medium including one or more instructions, that when executed by at least one processor, cause the at least one processor to:
execute the overload protection method according to claim 11.

15. A processor configured to run a program to execute the overload protection method according to claim 11.

16. A compressor, comprising:
a memory configured to store a plurality of instructions; and
a processor configured to load the plurality of instructions to execute the overload protection method according to claim 11,
wherein the compressor is the same as the compressor to be protected.

17. A compressor, comprising
an overload protection device
comprising: a first overload protection mechanism and a second overload protection mechanism, wherein:
the first overload protection mechanism is configured to provide overload protection for a pressure of the compressor, and comprises a pressure sensing port, a pressure diaphragm, a transmission rod and a control switch; and, the second overload protection mechanism is configured to provide overload protection for at least one of a temperature or a current of the compressor, and comprises a heater, and a temperature contact piece, wherein:

a first end of the transmission rod is adaptively in contact with the pressure diaphragm;

a second end of the transmission rod is adaptively in contact with a control end of the control switch;

at least one fixed end of the control switch is adaptively connected to a power supply end of the compressor through the heater;

the pressure sensing port is configured to allow refrigerant vapor of an exhaust end of the compressor to pass through and arrive at the pressure diaphragm, wherein the refrigerant vapor deforms the pressure diaphragm to force the transmission rod to move towards the control switch so as to turn off the control switch, or move away the control switch so as to turn on the control switch; and at least one contact end of the temperature contact piece is adaptively connected to the power supply end of the compressor through a temperature contact adaptively disposed with the temperature contact piece.

18. The compressor according to claim 17, wherein the compressor has one or more of the following features:
the compressor comprises a rotor type invariable frequency compressor or a vortex type invariable frequency compressor;
the overload protection device is adaptively installed in a top shell or a high pressure chamber of the compressor and is connected in series with a main circuit of a motor of the compressor.

19. An electric appliance, comprising: the compressor according to claim 17.

20. The electrical appliance according to claim 19, wherein the electrical appliance comprises at least one of an air conditioner, a refrigerator or a water heater.

* * * * *